United States Patent
Birr et al.

[15] 3,645,798
[45] Feb. 29, 1972

[54] METHOD FOR THERMOCHEMICALLY SCARFING A SEMIFINISHED PRODUCT

[72] Inventors: Jacques Birr, Paris; Bernard Abel, Epinal, both of France; Patrice Charbonnier, Pointe Noire, Congo

[73] Assignee: L'Air Liquide Societe Anonyme pour l'etude et l'exploitation des procedes Georges Claude

[22] Filed: July 29, 1969

[21] Appl. No.: 845,757

[30] Foreign Application Priority Data

Aug. 2, 1968 France..................................161766

[52] U.S. Cl..............................148/9.5, 148/9 C, 266/23 H, 266/23 P
[51] Int. Cl..........................................................B23k 7/06
[58] Field of Search....................266/23 H, 23 P; 148/9, 9 C, 148/9.5

[56] References Cited

UNITED STATES PATENTS

| | | |
|---|---|---|
| 2,290,290 | 7/1942 | Meincke....................................148/9 |
| 2,447,081 | 8/1948 | Miller et al. ............................266/23 |
| 3,411,466 | 11/1968 | Pfeuffer..................................266/23 |

Primary Examiner—Curtis R. Davis
Attorney—Young & Thompson

[57] ABSTRACT

Method for thermochemically scarfing a semifinished product having a horizontal face and a vertical face.

A scarfing torch scarfs simultaneously contiguous strips of both faces. A row of burners heats the upper portion of the vertical face. In case this face is too broad, a supplementary row of smaller scarfing torches scarfs the lower portion.

6 Claims, 1 Drawing Figure

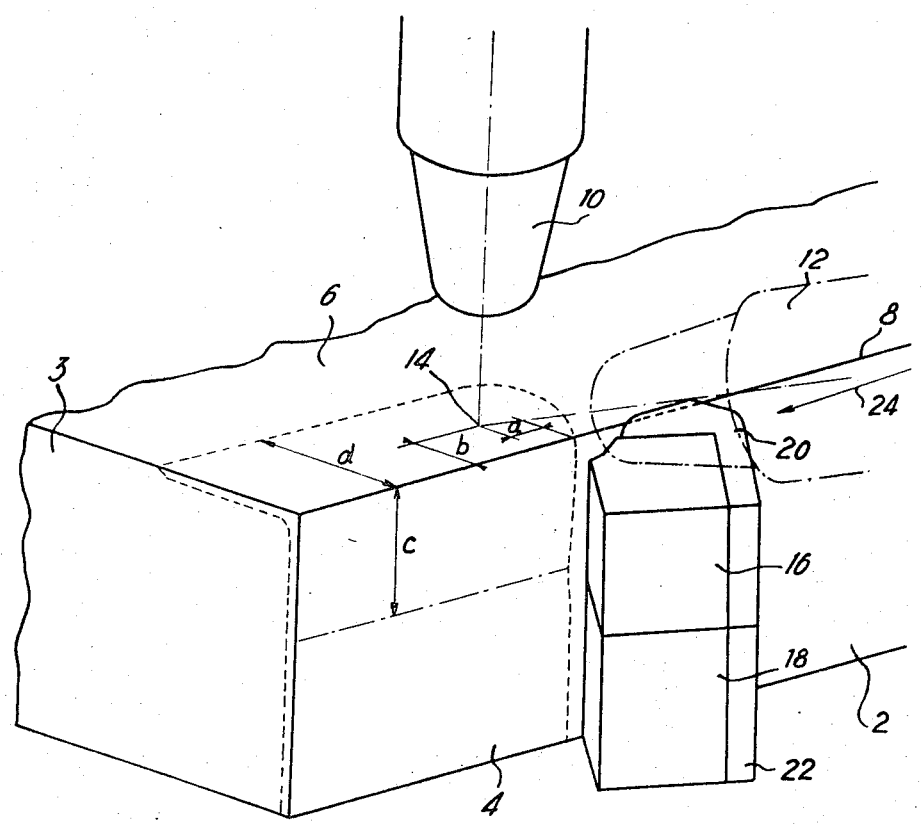

METHOD FOR THERMOCHEMICALLY SCARFING A SEMIFINISHED PRODUCT

This invention relates to a method of scarfing a substantially vertical face of a semifinished product having a vertical cross section of substantially rectangular dimensions.

In general, scarfing torches operate by means of one or more jets of oxygen and by means of one or more flames the main object of which is to bring a metal surface to a sufficiently high temperature for it to burn in the oxygen. If desired, auxiliary heating means may be provided which may take the form, for example, of the addition of iron in the form of a powder or a thin rod, or the surface of the workpiece may be separately heated by means of a plasma jet.

The method of the invention is characterized in that it is carried out wholly or partly by a scarfing torch arranged in such a position that scarfing of a strip of substantial width can be carried out therewith, which strip is located on the upper face of a semifinished body having a cross section of rectangular dimensions and includes the edge connecting the upper face to a side face substantially at right angles thereto and in that the scarfing of the side face is aided by one or more burners which are directed towards the said side face, these burners being heating burners which are not provided with a machining oxygen conduit.

The mean width of such a strip can vary depending on the size of the nozzle of the torch and the distance it is positioned from the surface of a workpiece which is to be treated. With the torches generally in use, this width can for example be from 2 to 8 cm., in particular from 3.5 to 4.5 cm. At any given setting of the torch nozzle, the width of the strip varies a little about its mean value. When carrying out the method of the invention, it is possible to vary this width by several millimeters without disturbing the scarfing operation.

The method according to the invention is particularly useful when scarfing semifinished products whose end or side faces are substantially vertical and are not as wide as the horizontal faces, the method being carried out using a machine comprising a scarfing torch so positioned that it can be moved to scarf a strip of such a horizontal face. When carrying out the method of the invention, it becomes possible, without the need to specially position or move the torch, to scarf an end or side face at least over a considerable width thereof in the same operation as a strip of a horizontal face is scarfed.

As will be readily understood from the description of the drawings which follows, one or more supplementary scarfing torches can be employed, when the side face is of a substantial height, to extend the scarfing of the side or end to the bottom thereof. The operation of such a supplementary scarfing torch is facilitated by the molten materials produced by the torch scarfing the main face.

For a better understanding of the invention and to show how the same can be carried into effect, reference will now be made by way of example to the accompanying drawing, which shows diagrammatically, in perspective view, a scarfing operation being carried out according to the invention.

Referring now to the drawing, there is shown part of a semifinished product 2 which terminates at one end face 3. At right angles to the end face 3 is a vertical side face 4 and at right angles to the faces 3 and 4 is a horizontal upper face 6. The side face 4 and the upper face 6 are joined along an edge 8.

In association with the product 2 are shown a number of torches and burners in the position they occupy at the beginning of a scarfing pass 1. A scarfing torch 10 is positioned above the face 6. At the beginning of the scarfing operation it will pass to the inclined position 12 by rotation of the axis of the nozzle thereof about a point 14 situated at a distance $b$ from the edge 8.
2. A heating burner 16 which can produce a flat flame or a vertical group of flames is provided adjacent the side face 4. The flames produced will contact the side face 4 at a distance $a$ to the rear of the axis of the torch nozzle. The upper edge of the flame is either flush with the face 6 or extends beyond it by several millimeters.
3. Below the burner 16, is positioned one or more further scarfing torches 18 whose flames are approximately in the same plane as the flames of the burner 16. The burner 16 and the torch(es) 18 bear on the semifinished product by means of wearing elements 20, 22, in order that they may remain a constant distance from the side face.

When carrying out the method of the invention, the burners 16 and the torches 18 are set in operation, and the torch 10 (in the position 12), aided by the burner 16, scarfs the side face 4 over a height $c$ and the upper face over a width $d$. The burner 16 serves to supply heat to the region in which oxidation takes place, in particular, to the edge 8 while allowing this region to remain stable and bathed in oxygen from the torch 10. If jets of machining oxygen were discharged from the burner 16, this region would be very unstable and there might be a risk that a melt pool might not be produced at all.

In the embodiment shown in the drawing, the side face 4 is of such a height that it cannot be scarfed over its entire height. Scarfing of this lower region below the height $c$ is effected by means of the further scarfing torch(es) 18. Initially, they benefit from the presence of the partly oxidized molten materials which are produced by the torch 10 and which run down the side face. The flame of the scarfing torch(es) 18 can also act on the region at the base of the zone of height $c$.

In practice, cutting or machining oxygen is only supplied to the scarfing torch(es) 18 after the oxidized metal melt has begun to flow down.

Once scarfing has started on the upper face and over the entire height of the side face 4, the group of scarfing torches and burners, including the torch 10 which has been displaced into an inclined position 12 with respect to the semifinished product, is displaced in the direction of the arrow 24. The contour of the volume finally removed by scarfing from the upper face and the side face has been shown in broken lines in the drawing. Its thickness can be seen at the end face 3.

In the case illustrated, scarfing has been shown beginning in a region between the ends of the semifinished product. It may also be commenced at one end.

Once the side face 4 and the strip of width $d$ have been scarfed, the remainder of the face 6 is scarfed if necessary by means of the torch 10 suitably disposed for this purpose. By using a row of torches similar to the torch 10, the entire face 6 can be scarfed at the same time as the side face 4.

The semifinished product is then turned over to scarf the other main face and the other side face.

The following figures indicate the values of $a$ to $d$ when carrying out scarfing, according to the embodiment shown in the drawing, scarfing a steel slab having a thickness of 0.36 m.:

$a=0.10$ m.;
$b=0.025$ m.;
$c=0.17$ m.;
$d=0.04$ m.;

It is often advantageous for the point where the axis of the torch in position 12 meets the semifinished product to be spaced by 10 to 20 mm. from the point where the axis of the torch in the upright position meets the semifinished product.

The heating and scarfing power of the torch 10 is generally greater than that of each of the heating burners 16 when heating is carried out using several burners rather than a single heating slit, and than that of each of the possible supplementary scarfing torch(es) 18.

The above method may be suitably varied without departing from the scope of the invention. For example it is possible to dispense with the torch(es) 18 when the semifinished product is not thick. A plurality of torches may be used to scarf the main face. The semifinished product may be displaced while the position of the scarfing torches and various burners are fixed. The vertical cross section of the semifinished product to be scarfed may be rectangular or square, the only essential requirement being that the main face and the side face be substantially at right angles to each other.

What we claim is:

1. A method of scarfing a metal workpiece that has an upper face and an upright side face substantially at a right angle to said upper face, said upper face and upright face meeting along an edge, comprising directing a stream of oxygen from a direction transverse to said upper surface against a region of said upper surface which is bounded by said edge, and directing flames which are substantially free from excess oxygen from a direction transverse to said side surface against a region of said side surface which is bounded by said edge.

2. A method as claimed in claim 1, and moving said stream of oxygen and said flames simultaneously in a direction parallel to said edge.

3. A method as claimed in claim 2, in which the center of said flames is to the rear of the center of said stream of oxygen with respect to the direction of movement.

4. A method as claimed in claim 1, and directing at least one further stream of oxygen from a direction transverse to said side face against a region of said side face which is below said flames.

5. A method as claimed in claim 4, the heat of reaction of the first-mentioned stream of oxygen with the metal of the workpiece being substantially greater than either the heat content of each of said flames or the heat of oxidation of said further stream of oxygen with the metal of the workpiece.

6. A method as claimed in claim 1, the heat of reaction of said stream of oxygen with the metal of the workpiece being substantially greater than the heat content of each of said flames.

* * * * *